Sept. 16, 1924.                                          1,508,987
                    C. S. RIDER ET AL
        BATTERY OF DRY CELLS AND PROCESS OF ASSEMBLING THE SAME
                     Filed March 11, 1922
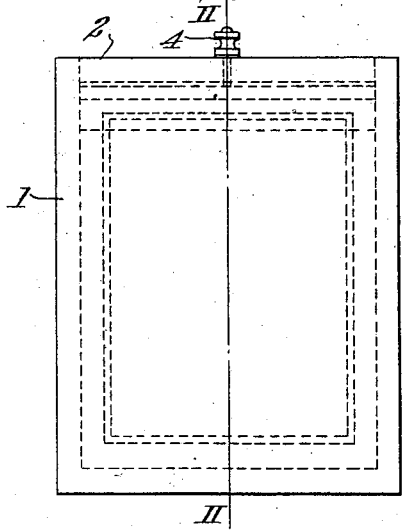
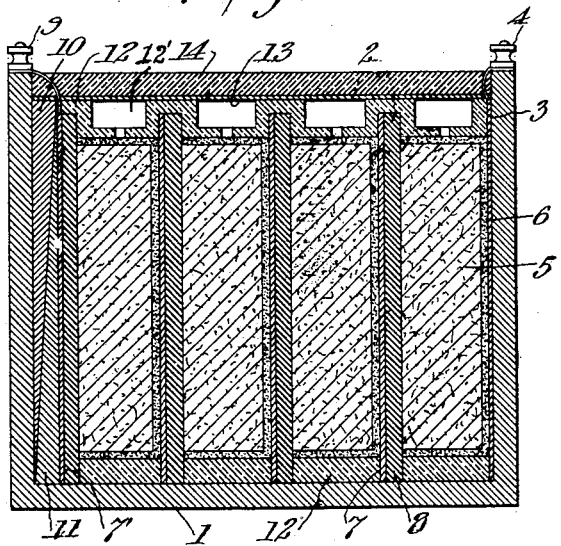
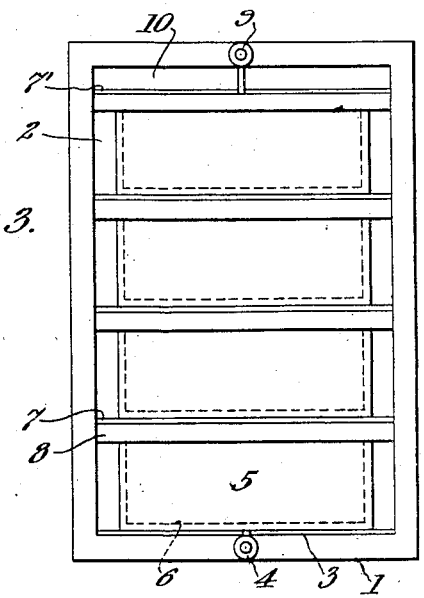

Patented Sept. 16, 1924.

1,508,987

UNITED STATES PATENT OFFICE.

CARL SEAVERNS RIDER, OF LANSING, MICHIGAN, AND ALTON KARL HUNTLEY, OF MADISON, WISCONSIN, ASSIGNORS TO NATIONAL CARBON COMPANY, INC., A CORPORATION OF NEW YORK.

BATTERY OF DRY CELLS AND PROCESS OF ASSEMBLING THE SAME.

Application filed March 11, 1922. Serial No. 543,095.

*To all whom it may concern:*

Be it known that we, CARL SEAVERNS RIDER and ALTON KARL HUNTLEY, citizens of the United States, residing at Lansing and Madison, respectively, in the counties of Ingham and Dane and States of Michigan and Wisconsin, have invented certain new and useful Improvements in Batteries of Dry Cells and Processes of Assembling the Same, of which the following is a specification.

This invention relates to dry cells of the flat type, and has particular reference to improvements in batteries composed of such cells.

It has heretofore been proposed to pack into a container a plurality of cells having flat exterior surfaces and a contour conforming to the shape of the container. This construction is advantageous for a number of reasons, among which is the compactness of the battery, resulting in a materially greater service capacity, for unit volume, than is obtainable from batteries of cylindrical cells. Also, the effective electrode area of the component flat cells is greater, and the internal resistance less, than that of cylindrical cells having the same cubic content. The present invention has for its object improvements in means and methods for obtaining these and other advantages of flat cell batteries.

To this end, a novel battery assembly, involving a special electrode structure, has been devised. The electrode comprises a metal plate coated with a non-corrodible, conducting composition electronegative to the metal. When the improved cells are assembled into battery formation, the coated electrode serves both as anode and cathode. This effects a marked simplification in construction and economizes space. In addition, the highly efficient contact between the adherent portions of the electrode, together with the other features to be described, insures the production of a maximum amount of service for a given cubic content.

In the accompanying drawings, illustrative of a preferred embodiment of the invention, Fig. 1 is an end elevation of a battery box, showing interior parts in outline, Fig. 2 is a vertical section on line II—II, Fig. 1, and Fig. 3 is a top plan view of the box, with the cover removed.

Reference numeral 1 denotes a battery box of insulating material, or of metal lined with an insulating compound. The assembly of the cells in the box is preferably carried out as follows: The box is placed on end with an open side 2 facing the operator, as shown in Fig. 3. A plate 3 of zinc or other suitable metal is laid in the box and is provided with a connector joining the plate to binding post 4. Mix cake 5, having a bibulous wrapper 6, is placed upon plate 3. The mix may contain any suitable amount of moisture and electrolyte salts, and the lining may be pasted, both according to known practice. Mix cake 5 is of somewhat smaller dimensions than the plate 3 and is centered on the plate.

An electrode comprising a metal plate 7 coated on one side with a conductive material 8, is next added, its coated side resting upon the mix cake. The area of the coated electrode is substantially the same as that of zinc plate 3, and these two elements are in vertical alinement.

The composite electrode 7, 8, is preferably prepared by coating zinc or other sheet metal on one surface with a graphite-containing plastic adapted to harden upon the metal. Any suitable conductive, corrosion resisting substance may be used and applied to the metal by rolling, pressing, or the like.

The following coating composition is given by way of example:

170 parts rosin,
30 parts boiled linseed oil,
300 parts graphite (passed through 30 mesh screen),
50 parts graphite (passed through 100 mesh screen).

These ingredients are melted and thoroughly mixed. The hot mixture is spread on the sheet metal, and the metal is then passed through heated iron rolls. The thickness of the plastic may be varied as desired, but a relatively thin layer is adequate to protect the metal base of the electrode and such a layer is preferred.

Other methods of forming the conductive coating may be adopted, such as forcing graphite particles into a plastic applied to the metal, or suspending graphite and a plastic in a volatile liquid and brushing or spraying the suspension on the metal.

A wrapped mix cake is placed upon the coated electrode 7, 8. Mix cakes and electrodes are added alternately until the box is filled. The last electrode 7' is preferably coated also on the side adjacent the box, and is provided with a connector leading to binding post 9.

Wedges 10, 11, are then adjusted so as to press the cells together and to hold their parts in assembled position when the box is set upright to receive a plastic insulating material 12.

This is preferably pitch or similar substance. It is poured or forced into the box in such amount as substantially to fill it, and that portion of the plastic which surrounds the mix cakes is rapidly solidified by immersing the box in cool water. The plastic above the mix cakes is less rapidly cooled and is poured off as soon as that beneath it is sufficiently hardened. In this manner air spaces 12' are formed between the projecting ends of electrodes 7, 8. The mix cakes are vented into the air spaces by perforating the plastic layer which may remain on their upper ends. Other insulating materials than pitch may be used, providing they are not penetrable by electrolyte and are capable of making a waterproof joint with the electrodes.

The battery is completed by placing a cardboard sheet 13 over the cells and sealing with plastic 14, in the usual manner.

It will be seen that the coated electrodes 7, 8, have a triple function, serving as anode for one cell, cathode for another, and series connection between the two cells. The simplicity and efficiency of this construction is evident. A further novel and advantageous feature of the battery described is the embedding of the mix cakes in an insulating and electrolyte-proof sealing compound. This prevents crumbling and obviates all danger of short circuiting between the several cells.

Single cells comprising a coated metal electrode like that herein described, and certain battery constructions analogous to that which we have invented, are described and claimed in the application of R. C. Benner, Serial No. 534,509 filed of March 6, 1922.

We claim:

1. In a battery, a plurality of cells having depolarizers and unitary electrode structures comprising electrically connected parts of diverse polarity, which serve respectively as anode and cathode for adjacent cells, and to connect such cells in series.

2. A battery comprising a plurality of flat dry cells having depolarizers and a unitary element between adjacent depolarizers, said element having a graphitic part serving as cathode for one cell and a metallic part serving as anode for another.

3. The invention described in claim 1, in which means are provided for compressing the cells.

4. A dry cell battery comprising a casing, a plurality of flat cells in juxtaposition and having depolarizers spaced from the casing and an insulating material in which the depolarizers are embedded.

5. A dry cell battery comprising a casing, a zinc plate at one end of the casing, a mix cake having a bibulous wrapping adjacent the zinc plate, a unitary element comprising a metal plate and a non-corrodible, conductive coating adherent thereto, the coating being in contact with a side of the mix cake and the metal plate in contact with a side of a second wrapped mix cake, and additional coated elements and mix cakes alternately until the desired number of cells is obtained.

6. A process of assembling a battery of dry cells, comprising inserting a plurality of cells in a casing, securing said cells in the casing in spaced relation thereto, and supplying an insulating compound between parts of the cells and the casing.

7. A process of assembling a battery of dry cells, comprising inserting a plurality of cells in a casing, securing said cells in the casing in spaced relation thereto, filling an insulating compound rendered fluent by heat into the casing, cooling the compound to solidify it about the cells only, and pouring off the remaining fluent compound to form air spaces at the tops of the cells.

8. A process of assembling dry cells to form a battery, comprising placing electrodes in a casing, operatively arranging depolarizing mix and electrolyte with respect to the electrodes and in spaced relation to the casing, and filling an insulating plastic compound into the spaces about the mix and electrolyte.

In testimony whereof, we affix our signatures.

CARL SEAVERNS RIDER.
ALTON KARL HUNTLEY.